(12) United States Patent
Krishna et al.

(10) Patent No.: US 11,843,596 B2
(45) Date of Patent: Dec. 12, 2023

(54) REREGISTRATION OF CLIENT DEVICE WITH SERVER DEVICE USING USER DEVICE

(71) Applicant: MICRO FOCUS LLC, Santa Clara, CA (US)

(72) Inventors: Vamsi Krishna, Bangalore (IN); Jason Blackett, Provo, UT (US); Harinath Jarugula, Bangalore (IN)

(73) Assignee: Micro Focus LLC, Santa Clara, CA (US)

( * ) Notice: Subject to any disclaimer, the term of this patent is extended or adjusted under 35 U.S.C. 154(b) by 247 days.

(21) Appl. No.: 17/363,677

(22) Filed: Jun. 30, 2021

(65) Prior Publication Data
US 2023/0006994 A1 Jan. 5, 2023

(51) Int. Cl.
*H04L 9/08* (2006.01)
*H04L 9/40* (2022.01)
*H04L 9/32* (2006.01)

(52) U.S. Cl.
CPC ........ *H04L 63/0846* (2013.01); *H04L 9/0869* (2013.01); *H04L 9/0894* (2013.01); *H04L 9/3228* (2013.01); *H04L 63/0838* (2013.01); *H04L 9/0891* (2013.01)

(58) Field of Classification Search
CPC ....... H04L 9/08; H04L 9/0869; H04L 9/0894; H04L 9/0891; H04L 9/32; H04L 9/3228; H04L 63/08; H04L 63/0846; H04L 63/0838
See application file for complete search history.

(56) References Cited

U.S. PATENT DOCUMENTS

| | | |
|---|---|---|
| 9,600,671 B2 | 3/2017 | Ye et al. |
| 9,800,562 B2 | 10/2017 | Lalwani et al. |
| 10,061,914 B2 | 8/2018 | Proulx et al. |
| 10,084,773 B2 | 9/2018 | Burch et al. |
| 10,701,064 B2 | 6/2020 | Nair |
| 10,812,473 B2 | 10/2020 | Ramesh Kumar et al. |
| 11,140,171 B1 * | 10/2021 | Friedman .............. H04L 9/0861 |

(Continued)

FOREIGN PATENT DOCUMENTS

CN 106230594 B 6/2019

OTHER PUBLICATIONS

Integrated Guide-Configuring TOTP(Multi-Factor-Authentication) using Google Authenticator on SonicWall SMA Appliance, May 2019.

*Primary Examiner* — Shaqueal D Wade-Wright
(74) *Attorney, Agent, or Firm* — Sheridan Ross P.C.

(57) ABSTRACT

Subsequent to registration of a client device with a server device such that credentials by which the client device is authenticated are securely stored at the client device, the client device provides a user device and a server device a recovery identifier and a recovery secret key associated with the client device. Upon the credentials no longer being stored at the client device such that the client device has to be reregistered with the server device to store new credentials by which the client device is authenticated, the user device generates and provides a recovery code to the client device, which provides the recovery code to the server device. Upon validating the recovery code based on the recovery identifier and the recovery secret key, the server device reregisters the client device with the server device such that the new credentials are securely stored at the client device.

20 Claims, 6 Drawing Sheets

(56) References Cited

U.S. PATENT DOCUMENTS

| | | | |
|---|---|---|---|
| 2008/0276098 A1* | 11/2008 | Florencio | G06F 21/46 713/183 |
| 2016/0149886 A1 | 5/2016 | Korokithakis et al. | |
| 2021/0099295 A1* | 4/2021 | Li | H04L 9/3226 |
| 2021/0176232 A1* | 6/2021 | Teran Guajardo | G06F 21/44 |
| 2023/0060803 A1* | 3/2023 | Moon | H04L 9/0861 |

* cited by examiner

REREGISTRATION OF CLIENT DEVICE WITH SERVER DEVICE USING USER DEVICE

BACKGROUND

In many computing environments, client devices are authenticated with server devices prior to functionality being performed. For example, in enterprise and other environments, a large number of client devices, which can also be referred to as endpoint devices, may be centrally managed via the exchange of information with a server device. Such client devices can include desktop, laptop, and notebook computers, as well as smartphones, tablet computing devices, and other types of computing devices. To protect the security of the information exchanged during endpoint management, the client devices are authenticated prior to information exchange.

DETAILED DESCRIPTION

As noted in the background, client devices are authenticated with server devices prior to the performance of functionality in a wide variety of different scenarios, including centralized endpoint management. So that a client device can be centrally managed via the exchange of information with a server device, the client device is initially registered with the server device. As part of this registration process, credentials by which the client device can later be authenticated with the server device are securely stored at both the client device and the server device. For example, the credentials may include a device identifier and a device password or secret. The client device presents its credentials to the server device in order for the client device to be authenticated with the server device.

The credentials therefore have to be securely stored at the client device (as well as at the server device). As one example, the client device may securely store its credentials in the first sector of a hard disk drive of the client device. Even if the hard disk drive is reformatted, reimaged, or is subject to operating system reinstallation, the credentials will not be overwritten, and therefore can continue to be used by the client device for authentication purposes with the server device. The client device may instead securely store its credentials in a different location, such as at a trusted platform module (TPM), a trusted memory, and so on.

However, hard disk drives occasionally fail, necessitating their replacement. If a client device's hard disk drive is replaced, the previously stored credentials become lost. In this case, the client device has to be reregistered with the server device, with new credentials by which the client device can be authenticated with the server device being securely stored at both the client device and the server device. Even if the client device's credentials are stored in a different location, such as at a TPM, which is less likely to fail, client device reregistration may still be periodically necessary. For example, existing credentials may become compromised, erroneously erased or overwritten, and so on.

Client device reregistration can be a supervised process necessitating the involvement of an administrator overseeing centralized endpoint management. For instance, the administrator may preapprove reregistration of a client device with the server device for a limited period of time by a unique identifier of the client device such as serial number, media access controller (MAC) address, and so on. Once the administrator has preapproved a client device in this manner, reregistration of the client device can be initiated. The client device sends a reregistration request to the server device that includes the unique identifier in question. So long as the request is received within the specified limited period of time, the server device reregisters the client device, resulting in new credentials by which authentication of the client device can occur being stored.

However, the supervised nature of this process can become burdensome for administrators overseeing the centralized endpoint management of thousands if not tens of thousands or more of client devices. It is not unreasonable for hundreds of client devices having to be reregistered on a weekly basis, for instance. The administrator may thus have to log into the server device and indicate the unique identifier of each client device that is permitted to be reregistered during a specified limited period of time. Supervised client device reregistration can therefore quickly overwhelm administrators.

Techniques described herein provide for client device reregistration with a server device in ways in which avoid these and other issues. The described client device reregistration process is unsupervised from the perspective of an administrator that may be overseeing the centralized endpoint management of large numbers of client devices. The administrator specifically is not involved in the reregistration process of a client device with a server device. The described reregistration process instead involves the user of the client device to be reregistered, via a different, user device of the user.

Figure 1:
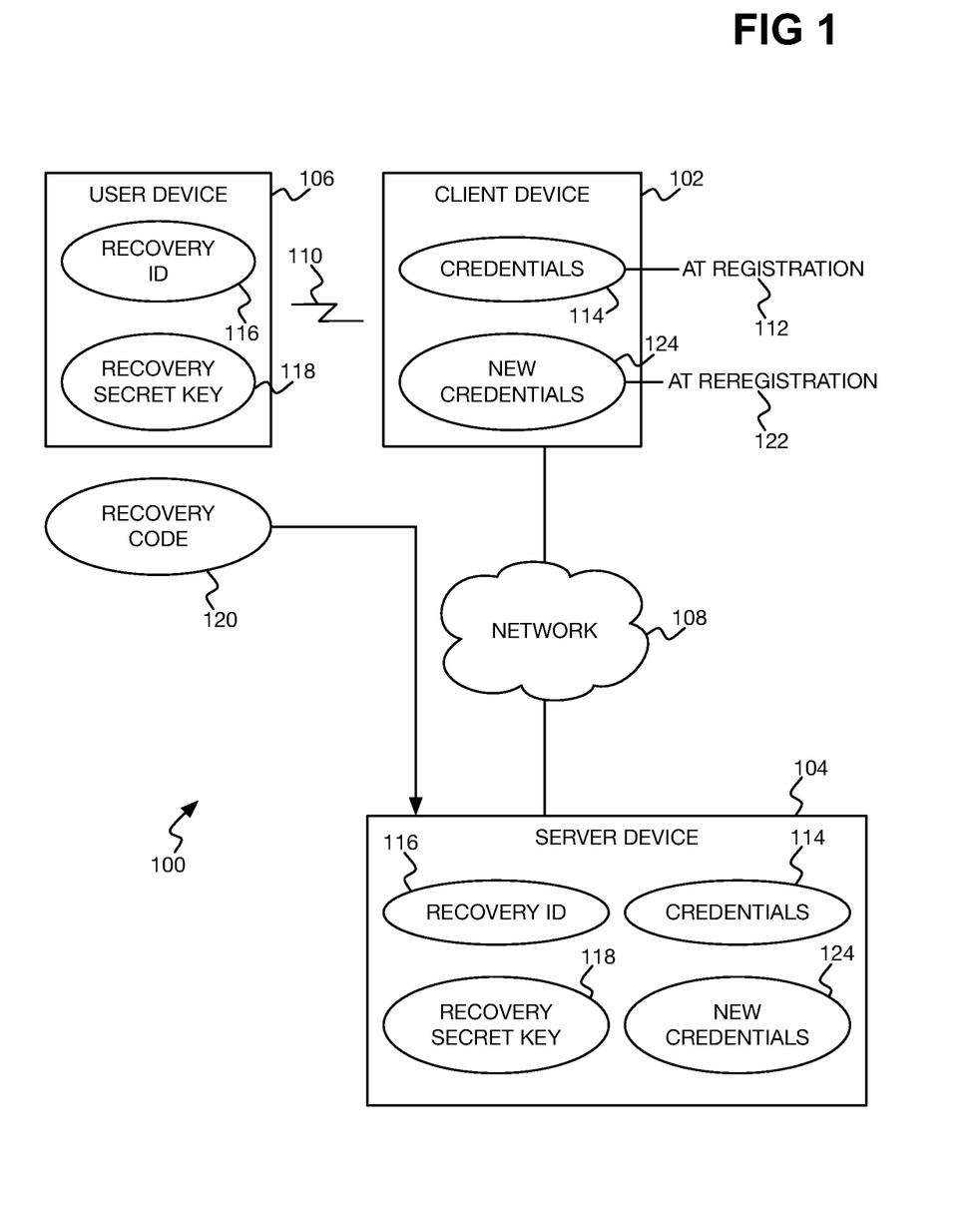
FIG. 1 is a diagram of an example system in which reregistration of a client device with a server device can be performed using a user device.

FIG. 1 shows an example system 100. The system 100 includes a client device 102, a server device 104, and a user device 106. The client device 102 may be a desktop, laptop, or notebook computer, as well as a smartphone, tablet computing device, or other type of computing device. The server device 104 is similarly a computing device. The user device 102 is also a computing device, and may be a mobile device such as a smartphone or tablet computing device, or another type of a computing device, such as a desktop, laptop, or notebook computer, for instance.

The client device 102 and the server device 104 are communicatively connected over a network 108, which may be or include the Internet, an intranet, an extranet, a wide-area network, a local-area network, a mobile communications network, a wired network, and/or a wireless network, among other types of networks. The client device 106 is also in communicative connection 110 with the user device 106. The communicative connection 110 may be a point-to-point wired, wireless (e.g., Bluetooth or near-field communication (NFC)), or optical connection, and can even be a user connection, in that a user enters information displayed at the client device 102 into the user device 106 and vice-versa.

The user of the user device 106 can be the same user as the user of the client device 102. This can be a different user than the administrator of the server device 104. For example, the user of the client device 102 and the user device 106 may be the end user of an enterprise or other organization in which the client device 102 is centrally endpoint-managed by the server device 104. The administrator may be responsible for or oversee such centralized endpoint management at the server device 104. Whereas the client device 102 is centrally managed by the server device 104, the user device 106 may not be, and indeed may be a personal device of the end user.

At initial registration 112 of the client device 102 with the server device 104, credentials 114 by which the client device 102 can be subsequently authenticated with the server device 104 are stored on the client device 102. The same or corresponding credentials 114 are also stored at this time on the server device 104. For example, in the case of authentication via a device identifier and a device password or secret, the identifier and the password or secret are stored at both the client device 102 and the server device 104. In the case of authentication via an asymmetric cryptographic key pair, the private key may be stored at the client device 102, and the public key at the server device 104.

Once registration 112 of the client device 102 with the server device 104 has occurred, a recovery identifier 116 and a recovery secret key 118 associated with the client device 104 are instantiated and stored at both the server device 104 and the user device 106. As one example, the identifier 116 and the secret key 118 may be generated by the client device 102. The client device 102 does not itself store the recovery identifier 116 and the recovery secret key 118, but communicates them over the network 108 to the server device 104 for storage, and communicates them over the connection 110 to the user device 106 for storage. As an example of the latter, the client device 102 may encode the recovery identifier 116 and the recovery secret key 118 within a quick response (QR) or other graphical code that the client device 102 then displays for image capture or other optical scanning by the user device 106, which subsequently decodes and stores the identifier 116 and the secret key 118.

Upon the credentials 114 no longer being stored at the client device 102, the client device 102 has to be reregistered with the server device 104 to store new credentials 124 by which the client device 102 can be authenticated with the server device 104. The server device 104 permits such reregistration 122 of the client device 102 after successfully validating a recovery code 120 generated by the user device 106. The user device 106 specifically generates the recovery code 120 based on the recovery identifier 116 and the recovery secret key 118 that the user device 106 previously stored. The user device 106 provides the recovery code 120 to the client device 102 over the connection 110. For example, the user device 106 may display the recovery code 120 for a user to manually input at the client device 102.

The client device 102 in turns provides the received recovery code 120 to the server device 104 over the network 108, and the server device 104 validates the recovery code 120 using the recovery identifier 116 and the recovery secret key 118 that the server device 104 previously stored. Upon successful validation of the recovery code 120, reregistration 122 of the client device 102 with the server device 104 occurs. Specifically, new credentials 124 by which the client device 102 can be authenticated with the server device 104 are stored on the client device 102, and the same or corresponding new credentials 124 are likewise stored on the server device 104.

The reregistration process thus does not involve the administrator responsible for or overseeing centralized management of endpoints like the client device 102, but rather involves the user of the user device 106 interacting with the client device 102. At initial registration 112, this user initiates instantiation of the recovery identifier 116 and the recovery secret key 118 for storage at the user device 106 and the server device 104. For reregistration 122 to occur, this user initiates generation of the recovery code 120 at the user device 106 for validation at the server device 104.

Figure 2:
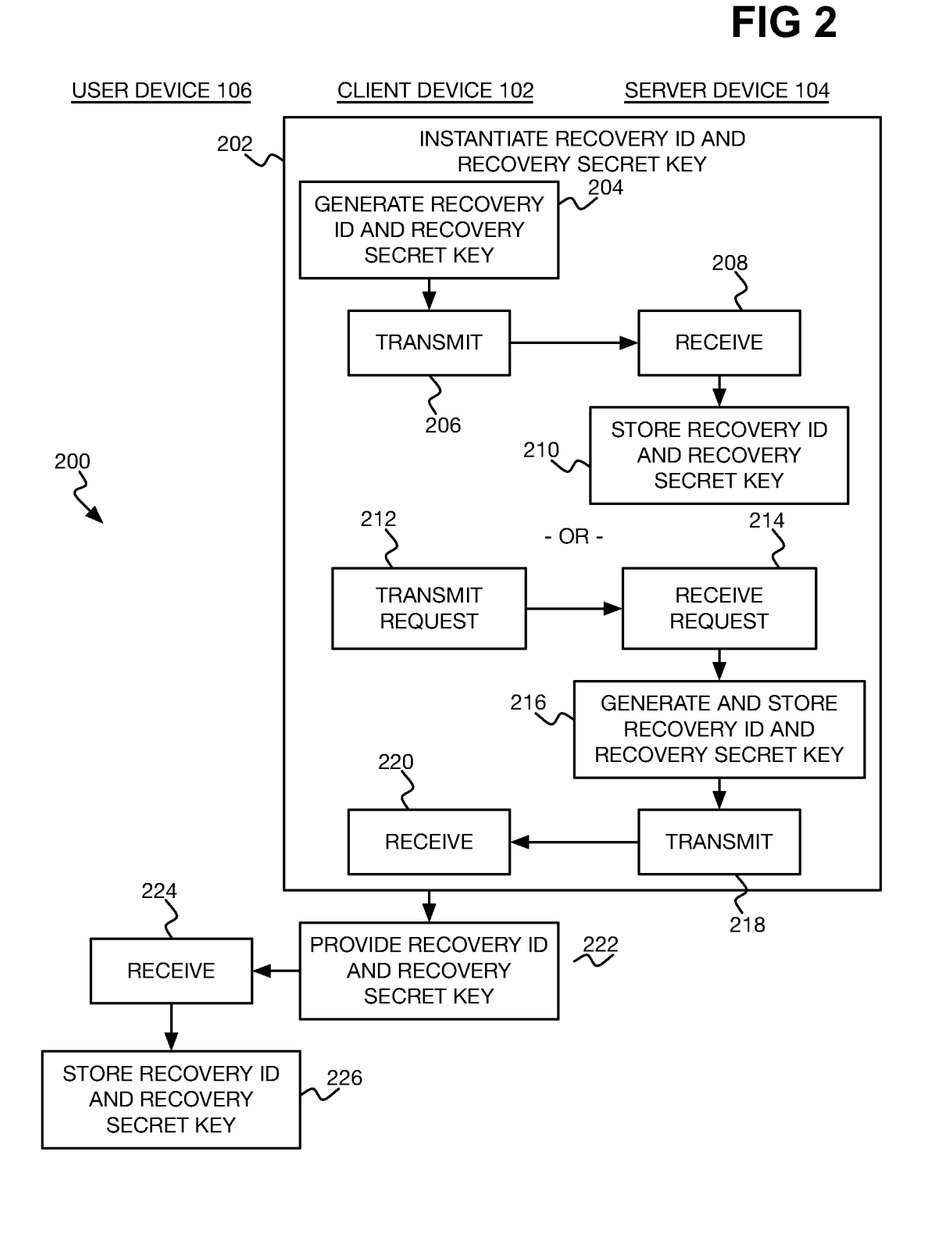
FIG. 2 is a diagram of an example process for generating and storing a recovery identifier and a recovery secret key for a client device, subsequent to registration of the client device with a server device.

FIG. 2 shows an example process 200 for generating and storing the recovery identifier 116 and the recovery secret key 118 subsequent to registration 112 of the client device 102 with the server device 104. The parts of the process 200 in the left column are performed by the user device 106; the parts in the middle column are performed by the client device 102; and the parts in the right column are performed by the server device 104. The left, middle, and right parts of the process 200 can be implemented as program code stored on a non-transitory computer-readable data storage medium and executed by a processor of a respective device. For example, the middle parts of the process 200 can be implemented as program code executed by a processor of the client device 102.

The client device 102 and the server device 104 instantiate the recovery identifier 116 and the recovery secret key 118 associated with the client device 102 (202). The recovery identifier 116 can be a unique randomly generated six-byte alphanumeric identifier. The recovery secret key 118 can be large randomly generated number or alphanumeric string that is sufficiently large to prevent it from being easily guessed, such as between 256 and 4,096 bits in length. In one implementation, a difference between the recovery identifier 116 and the recovery secret key 118 is that the former is encoded within and decodable from the recovery code 120 generated for reregistration 122 of the client device 102 to occur, whereas the latter is not. Rather, the recovery secret key 118 is used as a basis upon which a time-limited password of the recovery code 120 is generated, as described later in the detailed description. As such, the recovery secret key 118 does not have to be transmitted due to the usage of the time-limited password.

As noted, instantiation of the recovery identifier 116 and the recovery secret key 118 occur once (i.e., subsequent to) the client device 102 has been registered with the server device 104, such that the credentials 114 by which the client device 102 can be authenticated with the server device 104 have already been generated and stored. Instantiation of the recovery identifier 116 and the recovery secret key 118 can occur at behest of the user of the client device 102. For example, the user may log into the client device 102, and run a computer program that causes the recovery identifier 116 and the recovery secret key 118 to be instantiated.

In one implementation, instantiation of the recovery identifier 116 and the recovery secret key 118 can occur by the client device 102 itself generating the identifier 116 and the secret key 118 (204). The client device 102 thus transmits the generated recovery identifier 116 and generated recovery secret key 118 over the network 108 to the server device 104 (206), which receives (208) and then stores (210) the identifier 116 and the secret key 118. In another implementation, the server device 102, instead of the client device 102, may generate the recovery identifier 116 and the recovery secret key 118.

In this case, once instantiation of the recovery identifier 116 and the recovery secret key 118 has been initiated, the client device 102 sends a request over the network 108 to the server device 104 to generate the identifier 116 and the secret key 118 (212). The server device 104 receives the request (214), and responsively generates and stores the recovery identifier 116 and the recovery secret key 118 (216). The server device 104 then transmits the recovery identifier 116 and the recovery secret key 118 over the network 108 to the client device 102 (218), which receives the identifier 116 and the secret key 118 (220).

In either implementation, once the recovery identifier 116 and the recovery secret key 118 have been instantiated, the client device 102 provides the identifier 116 and the secret key 118 to the user device 106 (222), which receives them over the connection 110 (224). As noted above, for example, the client device 102 may encode the recovery identifier 116 and the recovery secret key 118 within a QR code that is displayed. The user causes the user device 106 to run a computer program, such as an app, that captures an image of or otherwise optically scans the QR code, and decodes the identifier 116 and the secret key 118 from the QR code. The user device 106 may receive the recovery identifier 116 and the recovery secret key 118 in another manner as well, such as via an NFC connection, a Bluetooth connection, and so on. The user device 106 then stores the recovery identifier 116 and the recovery secret key 118 (226).

The process 200 is performed after the client device 102 has been registered with the server device 104, so that the client device 102 can be reregistered with the server device 104 if necessary. For example, if the credentials 114 that were stored at the client device 102 during registration 112 are no longer stored on the client device 102, then the client device 102 has to be reregistered with the server device 104 so that new credentials 124 for authentication of the client device 102 can be stored. The process 200 is thus performed to generate and store the recovery identifier 116 and the recovery secret key 118 on which basis the user device 106 can generate a recovery code 120 that is validated by the server device 104 to permit subsequent reregistration 122 of the client device 102.

Figure 3:
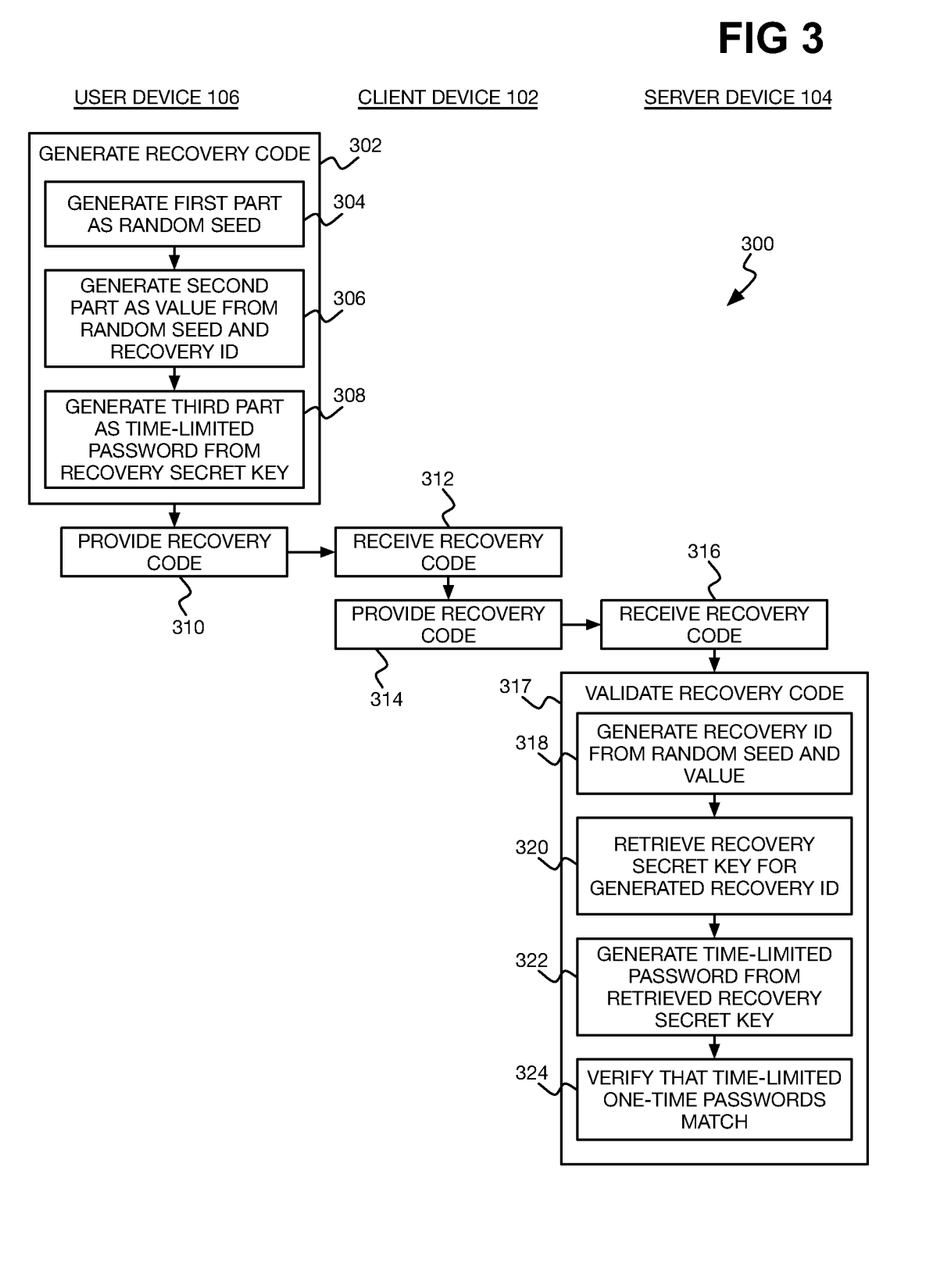
FIG. 3 is a diagram of an example process for generating and validating a recovery code to permit reregistration of a client device with a server device.

FIG. 3 shows an example process 300 for generating and validating the recovery code 120 to permit reregistration 122 of the client device 102 with the server device 104. The parts of the process 300 in the left column are performed by the user device 106; the parts in the middle column are performed by the client device 102; and the parts in the right column are performed by the server device 104. As with the process 200, the left, middle, and right parts of the process 300 can be implemented as program code and stored on a non-transitory computer-readable data storage medium and executed by a processor of a respective device.

The user of the user device 106 initiates the recovery code 120 generation and validation process at the user device 106, such as by running the same program on the user device 106 that stored the recovery identifier 116 and the recovery secret key 118. The user device 106 therefore generates the recovery code 120 from the previously stored recovery identifier 116 and the previously stored recovery secret key 118 (302). Specifically, the user device 106 generates a first part of the recovery code 120 as a random seed (304). The random seed may be a six-byte random alphanumeric string, for instance.

The user device 106 generates a second part of the recovery code 120 as a value from the random seed and the recovery identifier 116 (306), in such a way that the recovery identifier 116 is able to be generated from the value and the random seed. That is, the value encodes the recovery identifier 116 using the random seed in a way that permits the recovery identifier 116 to be decoded from the value and the random seed. For example, an exclusive-or (XOR) operation may be performed on the recovery identifier 116 and the random seed to generate the value, such that performing an XOR operation on the value and the random seed returns the recovery identifier 116.

The user device 106 generates a third part of the recovery code 120 as a time-limited password from the recovery secret key 118 (308). For instance, a one-time password algorithm may be performed that uses as input the recovery secret key 118 and a time-based counter, such as an epoch counter, truncated to a current time period, such as the current hour. The one-time password algorithm may be a hash-based message authentication code (HMAC)-based one-time password (HOTP) algorithm in one implementation.

The user device 106 provides the recovery code 310 over the connection 110 to the client device 102 (310), which receives the recovery code 310 (312). For example, in one implementation, the user device 106 may display the recovery code 310 for the user to manually enter into the client device 102. In another implementation, the user device 106 may transmit the recovery code 310 to the client device 102 over a Bluetooth connection, an NFC connection, or in another manner. The client device 102 in turn provides the recovery code 120 over the network 108 to the server device 104 (314), which receives the recovery code 310 (316).

The server device 104 validates the received recovery code 310 using the recovery identifier 116 and the recovery secret key 118 that the server device 104 previously stored (317). First, the server device 104 generates the recovery identifier 116 from the random seed of the first part of the recovery code 120 and the value of the second part of the recovery code 120 (318). For example, an XOR operation can be performed on the random seed and the value to generate the recovery identifier 116, if the value was previously generated by performing an XOR operation on the recovery identifier 116 and the random seed, as noted above.

The server device 104 then retrieves the recovery secret key 118 that the server device 104 previously stored for this generated recovery identifier 116 (320). For each of a number of client devices 102, the server device 104 will have stored a different pair of a recovery identifier 116 and a recovery secret key 118. Therefore, the server device 104 retrieves the recovery secret key 118 that the device 104 previously stored for the secret key 118 that has been generated from the recovery code 120.

Next, the server device 104 generates a time-limited password from the retrieved recovery secret key 118 (322). The time-limited password is generated by the server device 104 in the same way that the user device 106 did. For instance, the server device 104 may perform a one-time password algorithm, using as input the recovery secret key 118 that was retrieved for the recovery identifier 116 generated from the recovery code 120, along with a time-based counter truncated to a current time period. The current time period is sufficiently long that the same time period, such as the current hour, will be used by both the user device 106 and the server device 104 when performing the one-time password algorithm. However, the current time period is sufficiently short to ensure that the user device 106 and the server device 106 will generate different one-time passwords should too much time pass. In one implementation, the server device 104 may be able to accept a time-limited password that is based on a counter truncated to a previous time period (or the next time period) to be tolerant of time sync and network latency issues between the client device 102 and server device 104.

The server device 104 finally verifies that the time-limited password that the server device 104 generated matches the time-limited password of the third part of the recovery code 120 (324). The former time-limited password is generated by the server device 104 on the basis of the recovery secret key 118 that the server device 104 retrieved for the recovery identifier 116 that the server device 104 generated (i.e., decoded) from the recovery code 120. The latter time-limited password was generated by the user device 106 on the basis of the recovery secret key 118, and provided as the third part of the recovery code 120 to the server device 104. Therefore, so long as the user device 106 and the server device 104 store the same recovery identifier 116 and the same recovery secret key 118 for the client device 102, the two time-limited passwords will match if they have been generated within the same current time period.

Upon the server device 104 successfully validating the recovery code 120, the client device 102 can then be reregistered with the server device 104 as has been described. As such, new credentials 124 by which the client device 102 can be authenticated with the server device 104 can be stored during reregistration 122. Client device 102 reregistration 122 therefore does not require involvement of any administrator. Rather, the user of the user device 106 (and of the client device 102) can successfully complete client device 102 reregistration 122 him or herself.

Figure 4:
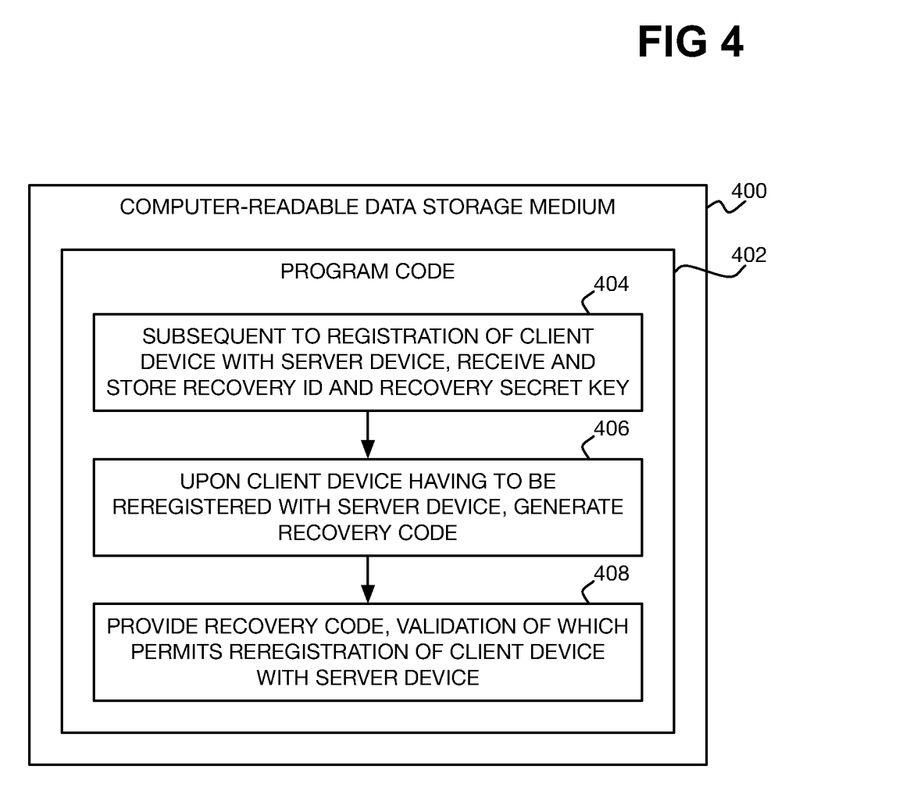
FIG. 4 is a diagram of an example non-transitory computer-readable data storage medium storing program code executable by a user device to facilitate reregistration of a client device with a server device.

FIG. 4 shows an example non-transitory computer-readable data storage medium 400 storing program code 402 executable by the user device 106 to facilitate reregistration 122 of the client device 102 with the server device 104. The program code 402 is executable to perform processing. The processing includes, subsequent to registration 112 of the client device 102 with the server device 104 such that credentials 114 by which the client device 102 is authenticated with the server device 104 are securely stored at the client device 102, receiving from the client device 102 and storing the recovery identifier 116 and the recovery secret key 118 associated with the client device 102 (404).

The processing includes, upon the credentials 114 no longer being stored at the client device 102 such that the client device 102 has be reregistered with the server device 104 to store new credentials 124 by which the client device is authenticated with the server device 104, generating a recovery code 120 (406). The recovery code 120 has a first part that includes a random seed, and a second part that includes a value generated from the random seed and the recovery identifier 116. The recovery identifier 116 is able to be generated from the random seed and the value of the second part. The recovery code 120 has a third part including a time-limited one-time password generated from the recovery secret key 118.

The processing includes providing the recovery code 120 to the client device 102 (408). The client device 102 responsively provides the recovery code 120 to the server device 104. Validation of the recovery code 120 by the server device 104 therefore permits reregistration 122 of the client device 102 with the server device 104 such that the new credentials 124 by which the client device 102 is authenticated with the server device 104 are securely stored at the client device 102.

Figure 5:
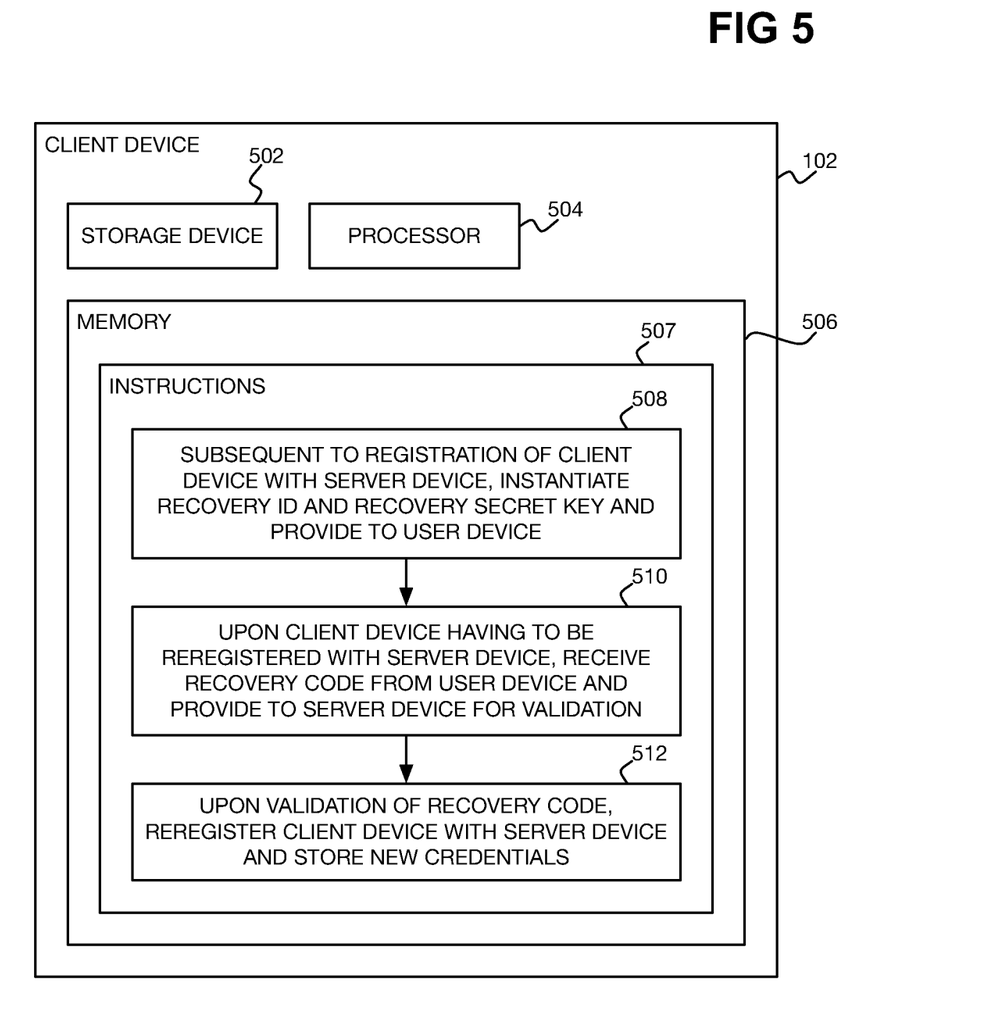
FIG. 5 is a diagram of an example client device that the reregistration of which with a server device can be facilitated by a user device.

FIG. 5 shows an example client device 102 that the reregistration 122 of which with the server device 104 can be facilitated by the user device 106. The client device 102 includes a storage device 502, such as a hard disk drive, at which credentials 114 by which the client device 102 is authenticated with the server device 104 are securely stored upon registration 112 of the client device 102 with the server device 104. The client device 102 includes a processor 504, and a memory 506 storing instructions 507 executable by the processor 504.

The instructions 507 are executable to, subsequent to the registration 112 of the client device 102 with the server device 104, instantiate the recovery identifier 116 and the recovery secret key 118 associated with the client device 102, and provide them to the user device 106 for storage (508). The instructions are executable to, upon the credentials 114 no longer being stored at the storage device 502 such that the client device 102 has to be reregistered with the server device 104 to store new credentials 124 by which the client device 102 is authenticated with the server device 104, receive a recovery code 120 from the user device 102, and provide the recovery code 120 to the server device 104 for validation (510). The recovery code 120 has first, second, and third parts, as noted above.

The server device 104 thus validates the recovery code 120 to permit reregistration 122 of the client device 102 with the server device 104 such that the new credentials 124 by which the client device 102 is authenticated with the server device 104 are securely stored at the storage device 502. Therefore, the instructions are executable to, upon validation of the recovery code 120 by the server device 104, reregister the client device 102 with the server device 104 and securely store the new credentials 124 at the storage device 502 (512). The client device 102 can then once again be authenticated with the server device 104.

Figure 6:
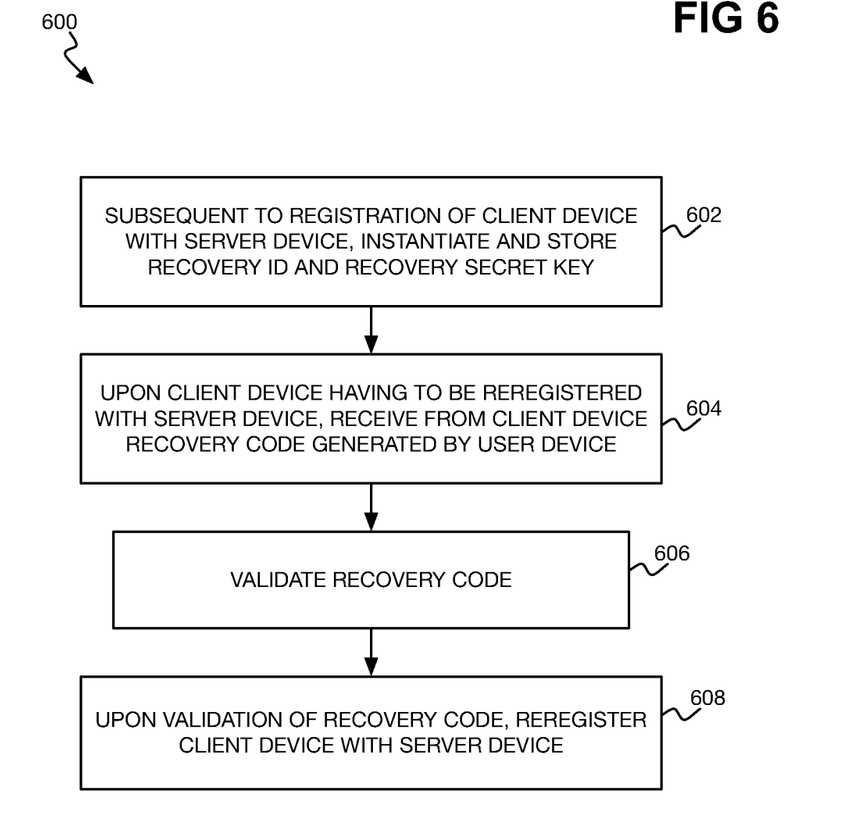
FIG. 6 is a flowchart of an example method performed by a server device to reregister a client device as facilitated by a user device.

FIG. 6 shows an example method 600 performed by the server device 104 to reregister the client device 102 as facilitated by the user device 106. The method 600 can be implemented as program code stored on a non-transitory computer-readable data storage medium and executed by a processor of the server device 104. The method 600 includes, subsequent to registration 112 of the client device 102 with the server device 104 such that the credentials 114 by which the client device 102 is authenticated with the server device 104 are securely stored, instantiating and storing the recovery identifier 116 and the recovery secret key 118 associated with the client device 102 (602).

The method 600 includes, upon the credentials 114 no longer being stored at the client device 102 such that the client device 102 has to be reregistered with the server device 104 to store new credentials 124 by which the client device 102 is authenticated with the server device 104, receiving from the client device 102 a recovery code 120 generated by the user device 106 and provided to the client device 102 (604). The recovery code 120 has first, second, and third parts, as noted above. The method 600 includes validating the recovery code 120 (606), and upon such validation, reregistering the client device 102 with the server device 104 such that the new credentials 124 by which the client device 102 is authenticated with the server device 104 are securely stored (608).

Techniques have been described herein for reregistering a client device 102 with a server device 104 by using a user device 106. The techniques do not require administrator supervision, and therefore can scale to environments in which an administrator is responsible for hundreds, thousands, tens of thousands, or even more client devices 102 that each have to have credentials 114 or 124 for authentication with the server device 104. Rather, a user of a client device 102 initiates reregistration of the client device 102 via his or her user device 106.

We claim:

1. A non-transitory computer-readable data storage medium storing program code executable by a user device to perform processing comprising:
subsequent to registration of a client device with a server device such that credentials by which the client device is authenticated with the server device are securely stored at the client device, receiving from the client device and storing a recovery identifier and a recovery secret key that are associated with the client device;
upon the credentials no longer being stored at the client device such that the client device has be reregistered with the server device to store new credentials by which the client device is authenticated with the server device, generating a recovery code having a first part comprising a random seed, a second part comprising a value generated from the random seed and the recovery identifier, where the recovery identifier is able to be generated from the random seed and the value, and a third part comprising a time-limited one-time password generated from the recovery secret key; and
providing the recovery code to the client device, the client device responsively providing the recovery code to the server device, the server device validating the recovery code to permit reregistration of the client device with the server device such that the new credentials by which the client device is authenticated with the server device are securely stored at the client device.

2. The non-transitory computer-readable data storage medium of claim 1, wherein the client device is reregistered with the server device, and the new credentials by which the client device is authenticated with the server device are securely stored at the client device, upon validation of the recovery code by the server device.

3. The non-transitory computer-readable data storage medium of claim 2, wherein the recovery identifier and the recovery secret key are further stored at the server device,
and wherein the server device validates the recovery code by generating the recovery identifier from the random seed of the first part of the recovery code and from the value of the second part of the recovery code, retrieving the recovery secret key for the generated recovery identifier, generating the time-limited one-time password from the retrieved recovery secret key, and verifying that the generated time-limited one-time password matches the time-limited one-time password of the third part of the recovery code.

4. The non-transitory computer-readable data storage medium of claim 1, wherein generating the recovery code comprises generating the value of the second part of the recovery code by performing an exclusive-or operation on the random seed and the recovery identifier.

5. The non-transitory computer-readable data storage medium of claim 1, wherein generating the recovery code comprises generating the time-limited one-time password of the third part of the recovery code by performing a one-time password algorithm using as input the recovery secret key and a time-based counter truncated to a current time period.

6. The non-transitory computer-readable data storage medium of claim 5, wherein the time-based counter comprises an epoch counter and the current time period comprises a current hour.

7. The non-transitory computer-readable data storage medium of claim 1, wherein receiving from the client device and storing the recovery identifier and the recovery secret key comprises optically scanning a graphical code in which the recovery identifier and the recovery secret key are encoded and decoding the recovery identifier and the recovery secret key from the optically scanned graphical code.

8. The non-transitory computer-readable data storage medium of claim 1, wherein providing the recovery code to the client device comprises displaying the recovery code to a user for the user to manually input at the client device.

9. A client device comprising:
a storage device at which credentials by which the client device is authenticated with a server device are securely stored upon registration of the client device with the server device;
a processor; and
a memory storing instructions executable by the processor to:
subsequent to the registration of the client device with the server device such that the credentials are securely stored at the storage device, instantiate a recovery identifier and a recovery secret key that are associated with the client device and providing the recovery identifier and the recovery secret key to a user device for storage;
upon the credentials no longer being stored at the storage device such that the client device has to be reregistered with the server device to store new credentials by which the client device is authenticated with the server device, receive from the user device a recovery code having a first part comprising a random seed, a second part comprising a value generated from the random seed and the recovery identifier, where the recovery identifier is able to be generated from the random seed and the value, and a third part comprising a time-limited one-time password generated from the recovery secret key;
provide the received recovery code to the server device, the server device validating the recovery code to permit reregistration of the client device with the server device such that the new credentials by which the client device is authenticated with the server device are securely stored at the storage device; and
upon validation of the recovery code by the server device, reregister the client device with the server device and securely store at the storage device the new credentials by which the client device is authenticated with the server device.

10. The client device of claim 9, wherein the recovery identifier and the recovery secret key are further stored at the server device,
and wherein the server device validates the recovery code by generating the recovery identifier from the random seed of the first part of the recovery code and from the value of the second part of the recovery code, retrieving the recovery secret key for the generated recovery identifier, generating the time-limited one-time password from the retrieved recovery secret key, and verifying that the generated time-limited one-time password matches the time-limited one-time password of the third part of the recovery code.

11. The client device of claim 9, wherein instantiating the recovery identifier and the recovery secret key comprises generating the recovery identifier and the recovery secret key at the client device, and wherein the instructions are executable by the processor to further transmit the generated recovery identifier and the generated recovery secret key to the server device for storage.

12. The client device of claim 9, wherein instantiating the recovery identifier and the recovery secret key comprises transmitting a request for the recovery identifier and the recovery secret key to the server device and responsively receiving from the server device the recovery identifier and the recovery secret key as generated at the server device.

13. The client device of claim 9, wherein providing the recovery identifier and the recovery secret key to the user device comprises generating a graphical code in which the recovery identifier and the recovery secret key are encoded and displaying the graphical code for optical scanning by the user device.

14. The client device of claim 9, wherein receiving from the user device the recovery code comprises receiving manual input of the recovery code by a user of the user device at the client device.

15. A method comprising:
subsequent to registration of a client device with a server device such that credentials by which the client device is authenticated with the server device are securely stored at the client device, instantiating and storing, by the server device, a recovery identifier and a recovery secret key that are associated with the client device;
upon the credentials no longer being stored at the client device such that the client device has to be reregistered with the server device to store new credentials by which the client device is authenticated with the server device, receiving by the server device from the client device a recovery code generated by a user device and provided to the client device, the recovery code having a first part comprising a random seed, a second part comprising a value generated from the random seed and the recovery identifier, where the recovery identifier is able to be generated from the random seed and the value, and a third part comprising a time-limited one-time password generated from the recovery secret key;
validating, by the server device, the recovery code; and
upon validation of the recovery code, reregistering, by the server device, the client device with the server device such that the new credentials by which the client device is authenticated with the server device are securely stored at the client device.

16. The method of claim 15, wherein validating the recovery code comprises:
generating the recovery identifier from the random seed of the first part of the recovery code and the value of the second part of the recovery code;
retrieving the recovery secret key for the generated recovery identifier;
generating the time-limited one-time password from the retrieved recovery secret key; and
verifying that the generated time-limited one-time password matches the time-limited one-time password of the third part of the recovery code.

17. The method of claim 16, wherein generating the recovery identifier from the random seed of the first part of the recovery code and the value of the second part of the recovery code comprises performing an exclusive-or operation on the random seed and the value.

18. The method of claim 16, wherein generating the time-limited one-time password from the retrieved recovery secret key comprises performing a one-time password algorithm using as input the retrieved recovery secret key and a time-based counter truncated to a current time period.

19. The method of claim 15, wherein instantiating the recovery identifier and the recovery secret key comprises receiving from the client device the recovery identifier and the recovery secret key as generated at the client device and provided to the user device.

20. The method of claim 15, wherein instantiating the recovery identifier and the recovery secret key comprises generating the recovery identifier and the recovery secret key at the server device,
and wherein the method further comprises transmitting, by the server device, the generated recovery identifier and the generated recovery secret key to the client device for providing to the user device.

* * * * *